United States Patent
Lieberman

(10) Patent No.: US 10,691,067 B2
(45) Date of Patent: *Jun. 23, 2020

(54) SYSTEMS AND METHODS FOR FABRICATING VARIABLE DIGITAL OPTICAL IMAGES BY PRINTING DIRECTLY ON GENERIC OPTICAL MATRICES

(71) Applicant: NANOGRAFIX CORPORATION, San Diego, CA (US)

(72) Inventor: Daniel Lieberman, San Diego, CA (US)

(73) Assignee: NANOGRAFIX CORPORATION, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/133,254

(22) Filed: Sep. 17, 2018

(65) Prior Publication Data

US 2019/0025758 A1 Jan. 24, 2019

Related U.S. Application Data

(63) Continuation of application No. 15/144,676, filed on May 2, 2016, now Pat. No. 10,078,304, which is a (Continued)

(51) Int. Cl.
*G03H 1/04* (2006.01)
*G06K 15/02* (2006.01)
(Continued)

(52) U.S. Cl.
CPC ......... *G03H 1/0443* (2013.01); *B42D 25/305* (2014.10); *B42D 25/328* (2014.10);
(Continued)

(58) Field of Classification Search
CPC ............ G03H 1/0443; G03H 1/04; G03H 2001/0016; G03H 1/0276; G03H 1/0011;
(Continued)

(56) References Cited

U.S. PATENT DOCUMENTS

| 5,138,471 A | 8/1992 | McGrew |
| 5,396,839 A | 3/1995 | Rice |

(Continued)

FOREIGN PATENT DOCUMENTS

| EP | 3256909 A1 | 12/2017 |
| JP | 2005-301066 | 10/2005 |

(Continued)

OTHER PUBLICATIONS

PCT/US2016/017212 International Preliminary Report on Patentability dated Aug. 24, 2017.
(Continued)

*Primary Examiner* — Jennifer D. Carruth
(74) *Attorney, Agent, or Firm* — LeonardMeyer LLP

(57) ABSTRACT

Variable digital optical images may be fabricated using generic optical matrices. A generic optical matrix may have a substrate and a plurality of pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. Individual ones of the pixels and sub-pixels of the generic optical matrix may be obliterated according to a negative while remaining pixels and/or sub-pixels may be preserved. The remaining pixels and sub-pixels may form an optical image corresponding to a base image. The optical image may be colored based on the remaining pixels. The optical image may exhibit non-color
(Continued)

effects corresponding to the remaining sub-pixels. The optical image may comprise a hologram or a stereo image.

20 Claims, 11 Drawing Sheets

Related U.S. Application Data continuation of application No. 14/930,494, filed on Nov. 2, 2015, now abandoned, which is a continuation of application No. 14/634,648, filed on Feb. 27, 2015, now Pat. No. 9,176,473.

(60) Provisional application No. 62/114,012, filed on Feb. 9, 2015.

(51) Int. Cl.
| | | |
|---|---|---|
| G02B 5/20 | (2006.01) | |
| G03H 1/02 | (2006.01) | |
| B42D 25/328 | (2014.01) | |
| B42D 25/425 | (2014.01) | |
| B42D 25/305 | (2014.01) | |
| G03H 1/00 | (2006.01) | |
| G02B 5/32 | (2006.01) | |
| G02B 30/34 | (2020.01) | |
| B41J 3/407 | (2006.01) | |

(52) U.S. Cl.
CPC .......... *B42D 25/425* (2014.10); *G02B 5/201* (2013.01); *G02B 5/32* (2013.01); *G03H 1/0011* (2013.01); *G03H 1/0276* (2013.01); *G03H 1/04* (2013.01); *G06K 15/02* (2013.01); *G06K 15/021* (2013.01); *G06K 15/1802* (2013.01); *G06K 15/188* (2013.01); *G06K 15/1849* (2013.01); *B41J 3/407* (2013.01); *G02B 30/34* (2020.01); *G03H 2001/0016* (2013.01)

(58) Field of Classification Search
CPC .. B42D 25/305; B42D 25/425; B42D 25/328; G06K 15/021; G06K 15/188; G06K 15/1802; G06K 15/1849; G06K 15/02; B41J 3/407; G02B 27/2228; G02B 5/32; G02B 5/201
See application file for complete search history.

(56) References Cited

U.S. PATENT DOCUMENTS

| | | | |
|---|---|---|---|
| 5,521,724 | A | 5/1996 | Shires |
| 5,784,200 | A | 7/1998 | Modegi |
| 5,790,703 | A | 8/1998 | Wang |
| 6,317,226 | B1 | 11/2001 | Yeh |
| 6,392,768 | B1 | 5/2002 | Yeh |
| 7,193,754 | B2 | 3/2007 | Borgsmuller |
| 7,729,027 | B2 | 6/2010 | Matsuyama |
| 7,796,318 | B2 | 9/2010 | Woodgate |
| 7,893,005 | B2 | 2/2011 | Funada |
| 7,934,752 | B2 | 5/2011 | Saito |
| 8,760,988 | B2 | 6/2014 | Nakamura |
| 9,176,328 | B1* | 11/2015 | Lieberman ............. G02B 5/201 |
| 9,176,473 | B1 | 11/2015 | Lieberman |
| 9,188,954 | B1* | 11/2015 | Lieberman ............... G02B 5/18 |
| 2001/0031405 | A1 | 10/2001 | Phillips |
| 2002/0102007 | A1 | 8/2002 | Wang |
| 2003/0067539 | A1 | 4/2003 | Doerfel |
| 2004/0101982 | A1 | 5/2004 | Woontner |
| 2004/0252867 | A1 | 12/2004 | Lan |
| 2005/0174620 | A1 | 8/2005 | Woontner |
| 2006/0098005 | A1 | 5/2006 | Yung |
| 2006/0250671 | A1 | 11/2006 | Schwerdtner |
| 2007/0054436 | A1 | 3/2007 | Hirakata |
| 2007/0109643 | A1 | 5/2007 | Lee |
| 2007/0195391 | A1 | 8/2007 | Nishikawa |
| 2008/0192343 | A1 | 8/2008 | Miyawaki |
| 2008/0198468 | A1 | 8/2008 | Kaule |
| 2008/0199803 | A1 | 8/2008 | Matsuyama |
| 2008/0231925 | A1 | 9/2008 | Tateishi |
| 2008/0240787 | A1 | 10/2008 | Saito |
| 2008/0246897 | A1 | 10/2008 | Gaudreau |
| 2008/0299332 | A1 | 12/2008 | Matsuyama |
| 2009/0251749 | A1 | 10/2009 | O'Boyle |
| 2009/0303597 | A1 | 12/2009 | Miyawaki |
| 2010/0110317 | A1 | 5/2010 | Chen |
| 2010/0165134 | A1 | 7/2010 | Dowski |
| 2010/0171811 | A1 | 7/2010 | Kamins-Naske |
| 2011/0002019 | A1 | 1/2011 | Routley |
| 2011/0187747 | A1 | 8/2011 | McCarthy |
| 2011/0261154 | A1 | 10/2011 | Chang |
| 2013/0215472 | A1 | 8/2013 | Rossier |
| 2013/0261782 | A1 | 10/2013 | Becken |
| 2015/0219807 | A1 | 8/2015 | Lochbihler |

FOREIGN PATENT DOCUMENTS

| | | |
|---|---|---|
| JP | 2008-096653 | 4/2008 |
| JP | 2010-113327 | 5/2010 |
| WO | WO-2011119098 A1 | 9/2011 |
| WO | WO-2016130592 A1 | 8/2016 |

OTHER PUBLICATIONS

PCT/US2016/017212 International Search Report and Written Opinion dated May 6, 2016.
U.S. Appl. No. 14/876,680 Office Action dated Mar. 29, 2016.
U.S. Appl. No. 14/634,648 Office Action dated Jun. 2, 2015.

* cited by examiner

SYSTEMS AND METHODS FOR FABRICATING VARIABLE DIGITAL OPTICAL IMAGES BY PRINTING DIRECTLY ON GENERIC OPTICAL MATRICES

CROSS REFERENCE TO RELATED APPLICATIONS

This application is a continuation of U.S. patent application Ser. No. 15/144,676 filed May 2, 2016, and entitled "SYSTEMS AND METHODS FOR FABRICATING VARIABLE DIGITAL OPTICAL IMAGES BY PRINTING DIRECTLY ON GENERIC OPTICAL MATRICES", which is a continuation of U.S. patent application Ser. No. 14/930,494 filed Nov. 2, 2015, and entitled "SYSTEMS AND METHODS FOR FABRICATING VARIABLE DIGITAL OPTICAL IMAGES BY PRINTING DIRECTLY ON GENERIC OPTICAL MATRICES", which is a continuation of U.S. patent application Ser. No. 14/634,648 filed Feb. 27, 2015, now U.S. Pat. No. 9,176,473 entitled "SYSTEMS AND METHODS FOR FABRICATING VARIABLE DIGITAL OPTICAL IMAGES USING GENERIC OPTICAL MATRICES" which claims the benefit of U.S. Provisional Patent Application No. 62/114,012, filed Feb. 9, 2015, and entitled "SYSTEMS AND METHODS FOR FABRICATING VARIABLE DIGITAL OPTICAL IMAGES USING GENERIC OPTICAL MATRICES", all of which are incorporated herein by reference.

FIELD OF THE DISCLOSURE

This disclosure relates to fabricating variable digital optical images using generic optical matrices.

BACKGROUND

Optical images that create two-dimensional and/or three-dimensional effects may typically be printed using lenticular lens techniques, holographic techniques, and/or stereographic techniques. As these different techniques have come to be used more and more, a need has arisen in the printing industry for the capability of generating such images quickly and at low cost and of integrating them into ink printing machinery so that they can easily be incorporated in printed materials such as labels, packaging, security printouts, and/or other printed materials. As it presently stands, these techniques generally involve long production waiting times and limited to specialized companies such as holographic companies.

Indeed, to date, the implementation of optical images that create two-dimensional and/or three-dimensional effects within printing applications has generally been costly and time-consuming. In the case of holograms, these may be produced by holographic companies that have very expensive equipment. The process may be slow and costly. Contemporary hologram technology may require companies that have an optical laboratory in which the hologram is made on a photoresist plate. The optical laboratory may include laser equipment, anti-vibration tables, other specialized equipment, and trained personnel. Once a hologram is initially made, it may be called a master, but it may not be used for large-scale production. As such, the company may also need an electroforming laboratory, where the photoresist master is introduced into a bath of nickel sulfamate for the purpose of cultivating a nickel copy on the surface of the photoresist. Once the nickel is of sufficient thickness, it may be separated from the photoresist copy in order to create a negative copy of the original image. It is from this nickel that the laboratory may cultivate a series of copies that may later be called nickel shims and may be used to engrave the image on a variety of supporting materials.

Next, in order to engrave the image, it may be necessary to have special equipment. Depending on the final product, there may be additional equipment for different applications. These processes often take several days and are processes that are completely distinct from ink printing. For the purpose of using these optical structures, the printers customarily rely on specialized companies (e.g., holographic companies) that generate the required images according to their needs. In addition to the investment of additional time needed to interface with those specialized companies, printers may be required to invest in equipment that enables the printer to transfer the optical structures onto their printed products.

SUMMARY

One aspect of the disclosure relates to a system configured for fabricating variable digital optical images using generic optical matrices. Exemplary implementations may enable printers throughout the world to have the capability to generate optical structures as if they were an additional "ink" at an additional "ink" station in their printing equipment. Some implementations may enable printers to vary the optical image that is being printed. The generic optical matrix may be used in conjunction with a negative and a UV lacquer (or other approach) to selectively obliterate certain pixels and/or sub-pixels to instantly create an optical image that may be used to print optical images in printing equipment.

While the present disclosure relates primarily to fabricating variable digital optical images using generic optical matrices, exemplary implementations for generic optical matrices are discussed in U.S. patent application Ser. No. 14/634,663, filed Feb. 27, 2015, now U.S. Pat. No. 9,176,328 and entitled "GENERIC OPTICAL MATRICES HAVING PIXELS CORRESPONDING TO COLOR AND SUB-PIXELS CORRESPONDING TO NON-COLOR EFFECTS, AND ASSOCIATED METHODS," and exemplary implementations for generating a negative are discussed in U.S. patent application Ser. No. 14/634,671, filed Feb. 27, 2015, now U.S. Pat. No. 9,188,954 entitled "SYSTEMS AND METHODS FOR GENERATING NEGATIVES OF VARIABLE DIGITAL OPTICAL IMAGES BASED ON DESIRED IMAGES AND GENERIC OPTICAL MATRICES," both of which are incorporated herein by reference.

Exemplary implementations may provide to printers an ability to control all aspects of their production, including the generation of complex optical images (e.g., holograms) without having to invest in expensive and complex optics and equipment for the application thereof. In other words, exemplary implementations may facilitate continuous systems that are easily and inexpensively integrated into printers' prepress and production departments. As a result, printers may be able to supply their clients quickly with a combination of prints and complex optical images at reasonable cost during prepress and production.

Some implementations may facilitate instantly or rapidly creating optical structures on a large-scale to create many types of images without the use of laser, electroforming, expensive molds, and/or embossing equipment. Applications of these optical structures may include emphasizing the aesthetic effect of a label; providing 3D prints for augmented reality and/or virtual reality systems (e.g., Microsoft® HoloLens™); making packaging more attractive to the consumer; adding security to government documents, paper currency, credit cards, passports, labels, packaging, and/or other security applications; track and trace applications; scratch-off lottery tickets; RFID antennas combined with variable optical images; and/or other applications.

According to some implementations, they may facilitate recording, molding, and/or printing optical structures in such a manner that they turn out to be variable, meaning that after individual printing cycles a new and different optical image can be instantly produced. For example, an optical image may change from label to label with a purpose of increasing security of the product on which the label has been adhered, and/or with a purpose of personalizing packaging with a unique optical characteristic for individual packages. This is digital printing of optical structures.

Some implementations may be used with traditional printing equipment, digital equipment, desktop printers, and/or other equipment setups with the purpose of producing optical structures continuously or on demand with the ink printing of these machines. As such, the cost of generating these optical images may be dramatically reduced and may approach costs that are more similar to those of pre-printing in the printing industry.

In contrast to contemporary technologies for generating optical images, exemplary implementations may not require creating a new image from the ground up every time a new or altered image is desired. According to some implementations, the generic optical matrix may be used to instantly generate some type of image which can later be engraved, molded, displayed on 3D monitors or other displays, and/or be combined with prints from other printing techniques involving conventional printing equipment, rotogravure, inkjet printing, digital printing, offset printing, laser printing, desktop printers, laser coders, inkjet encoding equipment, and/or other printing techniques.

In accordance with some implementations, the system may comprise an image negative component and an image generation component. The image negative component may be configured to retain a negative corresponding to a base image. The negative may be based on the base image and a geometry associated with a generic optical matrix. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. The image generation component may be configured to obliterate individual ones of the pixels and/or sub-pixels of the generic optical matrix according to the negative while preserving remaining pixels and/or sub-pixels. The remaining pixels and/or sub-pixels may form an optical image corresponding to the base image. The optical image may be colored based on the remaining pixels. The optical image may exhibit non-color effects corresponding to the remaining sub-pixels.

According to exemplary implementations, the sub-pixels may comprise gratings (or other optical structures) in a transparent material. Individual ones of the sub-pixels may be obliterated making them transparent in order to make an underlying substrate visible through the obliterated gratings (or other optical structures). Thus, if the substrate is colored at a position that coincides with an obliterated sub-pixel, that color may be visible through the transparent material of the corresponding sub-pixel. In some implementations, individual sub-pixels may include a translucent or transparent color. Additionally, individual sub-pixels may be overprinted with transparent inks and/or translucent inks with various densities of black or other colors.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
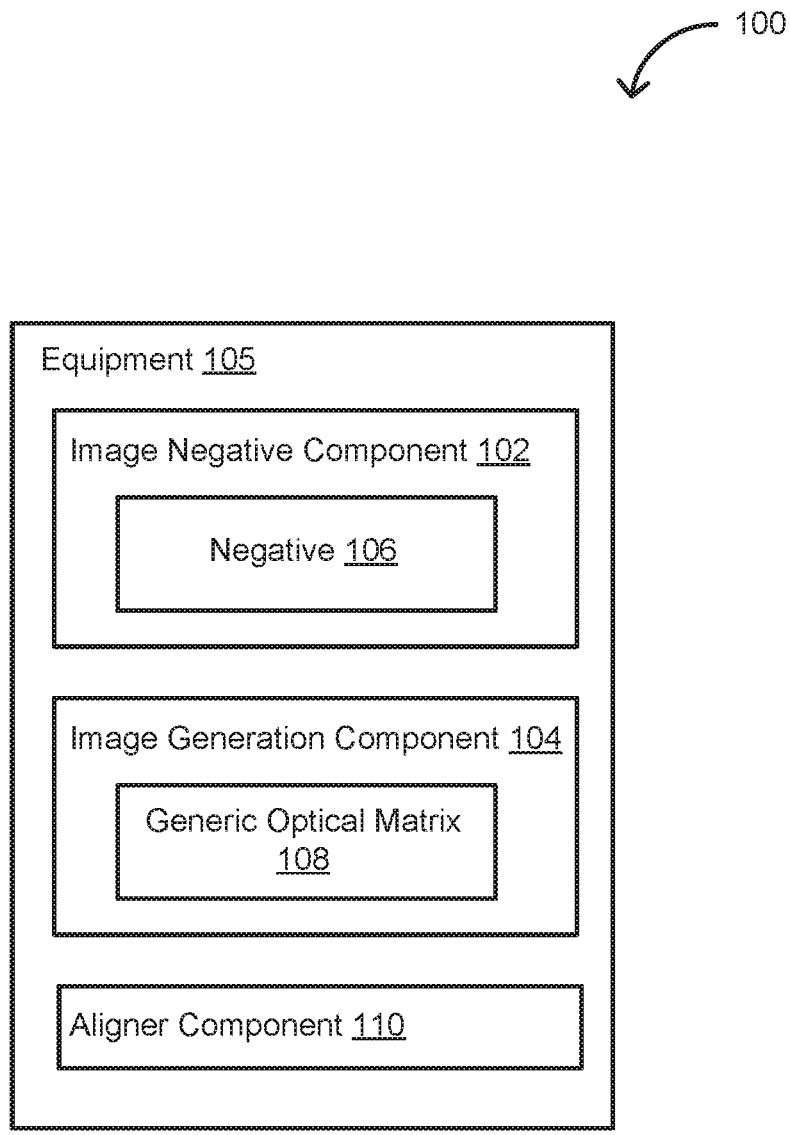
FIG. 1 illustrates a system configured for fabricating variable digital optical images using generic optical matrices, in accordance with one or more implementations.

FIG. 1 illustrates a system 100 configured for fabricating variable digital optical images using generic optical matrices, in accordance with one or more implementations. In exemplary implementations, system 100 may include one or more of an image negative component 102, an image generation component 104, and/or other components. One or more components of system 100 may be included in equipment 105. Equipment 105 may include one or more of traditional printing equipment, roll-to-roll printing equipment, embossing equipment, digital printing equipment, desktop printing equipment, display screens (e.g. 3D displays), printing devices, printing accessories, printing supplies, flexographic equipment, offset equipment, rotogravure equipment, demetallizing equipment, silkscreen equipment, ink jet equipment, silver halide photographic equipment, and/or other equipment.

The image negative component 102 may be configured to retain a negative 106 corresponding to a base image. The base image may include a physical likeness or representation of a person, animal, and/or thing that is photographed, painted, and/or otherwise made visible. According to various implementations, negative 106 may be embodied on a physical substrate or negative 106 may be in an electronic format, as discussed further herein. As such, image negative component 102 may include a physical apparatus configured to physically retain a physical substrate embodying negative 106. The image negative component 102 may include electronic storage configured to store negative 106 in an electronic format. The image negative component 102 may include one or more processors configured to provide information associated with negative 106 to one or more other components of system 100.

Figure 2:
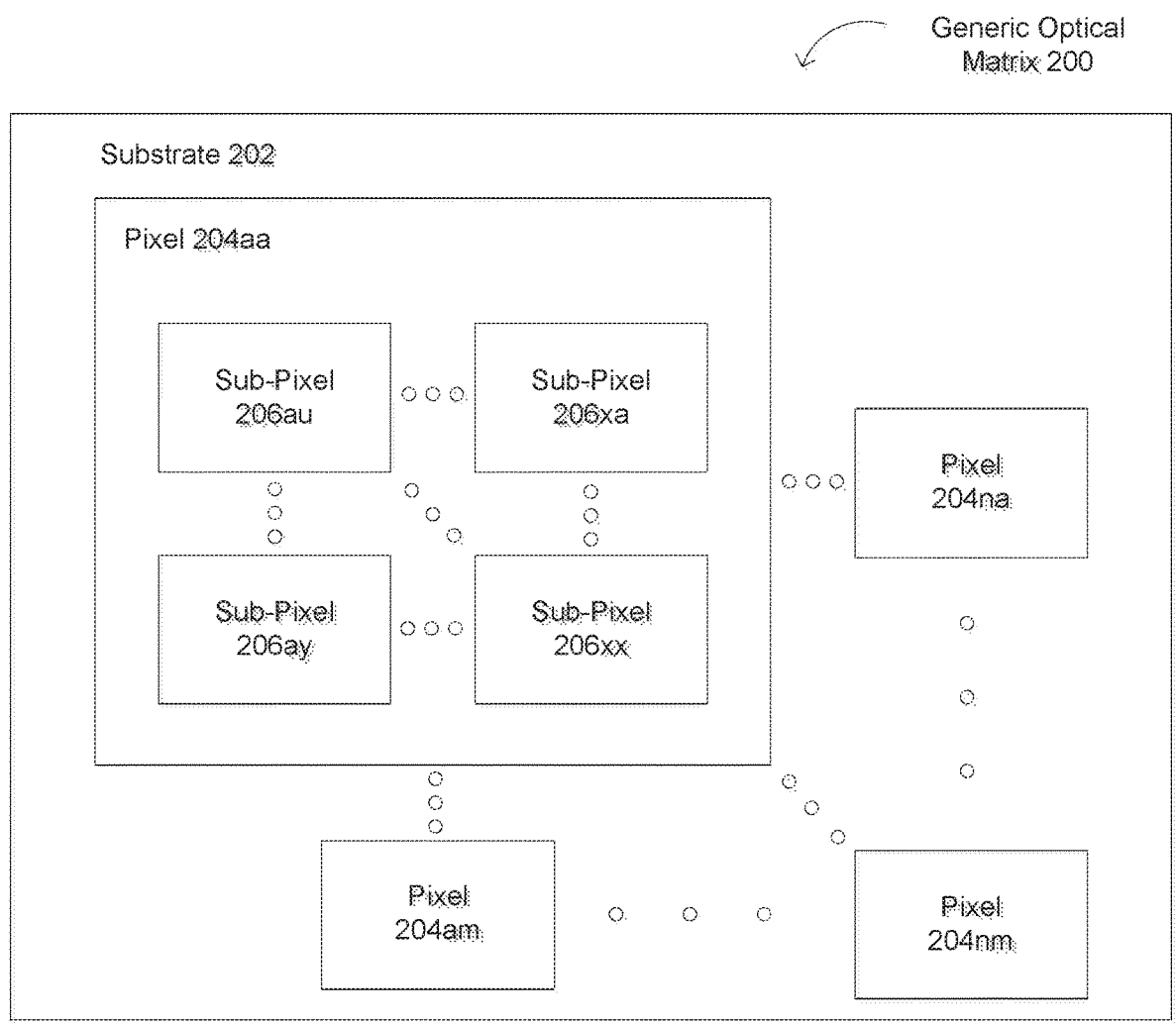
FIG. 2 illustrates a generic optical matrix having pixels corresponding to color and sub-pixels corresponding to non-color effects, in accordance with one or more implementations.

The negative 106 may be based on the base image and a geometry associated with a generic optical matrix. Exemplary implementations for generating a negative are described in further detail in U.S. patent application Ser. No. 14/634,671, filed Feb. 27, 2015 incorporated supra. The generic optical matrix may have pixels corresponding to color and sub-pixels corresponding to non-color effects. For example, the pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. FIG. 2 illustrates a generic optical matrix 200, in accordance with one or more implementations. As depicted, the generic optical matrix 200 may include a substrate 202 with pixels 204 corresponding to color and sub-pixels 206 corresponding to non-color effects. Exemplary implementations, generic optical matrices are described in further detail in U.S. patent application Ser. No. 14/634,663, filed Feb. 27, 2015 incorporated supra.

Referring again to FIG. 1, image generation component 104 may be configured to obliterate individual ones of the pixels and/or sub-pixels of a generic optical matrix 108 according to negative 106 while preserving remaining pixels and/or sub-pixels. The remaining pixels and/or sub-pixels may form an optical image corresponding to the base image. The optical image may be colored based on the remaining pixels. The optical image may exhibit non-color effects corresponding to the remaining sub-pixels. The non-color effects of the remaining sub-pixels may give rise to one or more optical effects observable when viewing the optical image. The one or more optical effects may include one or more of a three-dimensional optical effect, a two-dimensional optical effect, a dynamic optical effect, a scattering effect, a holographic white effect, a lens effect, a Fresnel lens effect, a brightness modulation effect, a lithographic effect, a stereogram effect, a nanotext and/or microtext effect, a hidden image effect, a moire effect, a concealed animated pattern effect, a covert laser readable (CLR) effect, a multiple background effect, a pearlescent effect, a true color image effect, a guilloche effect, an animation effect, an achromatic Fresnel effect, a dynamic CLR image, a kinematic images, a full parallax effect, a scratch holographic effect, a polarizing effect, a watermark effect, a metallic effect, a binary optical structure, a Fresnel prism, and/or other optical effects.

Individual ones of the remaining sub-pixels may reflect light at a specific viewing angle with a color corresponding to that of the individual pixels associated with the remaining sub-pixels. According to some implementations, the optical image may comprise one or more of a hologram, a stereo image, an optically variable device (OVD) based image, a diffractive optically variable image, a zero order device (ZOD) based image, a blazed diffraction structure based image, a first order device (FOZ) based image, a dot matrix image, a pixelgram image, a structural color structure based image, a diffractive identification device (DID) based image, an interference security image structure (ISIS) based image, a kinegram image, an excelgram image, a diffractive optical element based image, a photonic structure based image, a nanohole based image, computer generated holograms, electron-beam generated optical structures, interference patterns, and/or other optical images.

According to some implementations, a person may view the optical image from a specific viewpoint or viewing window (e.g., a range of viewing angles and/or distances). By changing the viewpoint or viewing window (e.g., by moving the optical image relative to the person's eyes), observed colors of the optical image may change due to the reflective properties of the optical structures included in the optical image. The viewpoint or viewing window may be limited in implementations where only the optical structures provide color in the optical image. In order to avoid such a limitation, the optical image may be overprinted with specific colors at corresponding pixels and/or sub-pixels. For example, if the optical image includes two sub-pixels to be viewed as red—one for the right eye and one for the left eye, the viewpoint or viewing window may be relatively small. However, by overprinting those two sub-pixels with a translucent red colored ink, the viewpoint or viewing window may increase because this colored ink maintains the red color with no shift through the rainbow and optical structures of the two sub-pixels keep reflecting light to desired directions. In some implementations, high refractive index lacquers may be used for the purpose of being able to overprint on top with translucent inks and/or lacquers without obliterating pixels and/or sub-pixels. Thus, some implementations may provide optical images having pixels and/or sub-pixels that reflect their particular color but shift throughout the rainbow at different angles, or have a colored filter that helps them extend the viewpoint or viewing window.

In some implementations, translucent or transparent material may be used to overprint pixels that are not obliterated. The translucent or transparent material may be configured to act as a color filter. The color filter may be configured to increase an angle of observation of the optical image. The translucent or transparent material may include one or more of a lacquer, a UV ink, and/or other materials. The translucent or transparent material may have a high refractive index. In some implementations, the high refractive index may be greater than that of a material making up the optical structures of sub-pixels of the generic optical matrix. The index of refraction of a material making up the optical structures of sub-pixels of the generic optical matrix may be between approximately 1.4 and approximately 1.6. In some implementations, the high refractive index may be between approximately 1.75 and approximately 2. The high refractive index may be greater than 2. One reason for the difference in index of refraction between the generic optical matrix and the material used for overprinting is that when optical structures are covered by a material with the same index of refraction, the optical structure may become obliterated. In some implementations, overprinting pixels and/or sub-pixels may be performed with RGB or YMCK printing systems using inks in order to generate full color images where pixels and/or sub-pixels below the translucent or transparent inks continue to provide corresponding non-color effects.

The negative 106 being embodied on a physical substrate may facilitate a number of techniques for producing optical images. In some implementations, the physical substrate embodying negative 106 may include a transparent film with negative 106 printed thereon, a UV lacquer laminate, a polycarbonate laminate, an acrylic laminate, a silicon laminate, a glass laminate, a projection negative, a demetallized substrate, a chemical etched substrate, a laser ablated substrate, an ion etched substrate, a UV high refractive index substrate, and/or other substrates.

Figure 3:
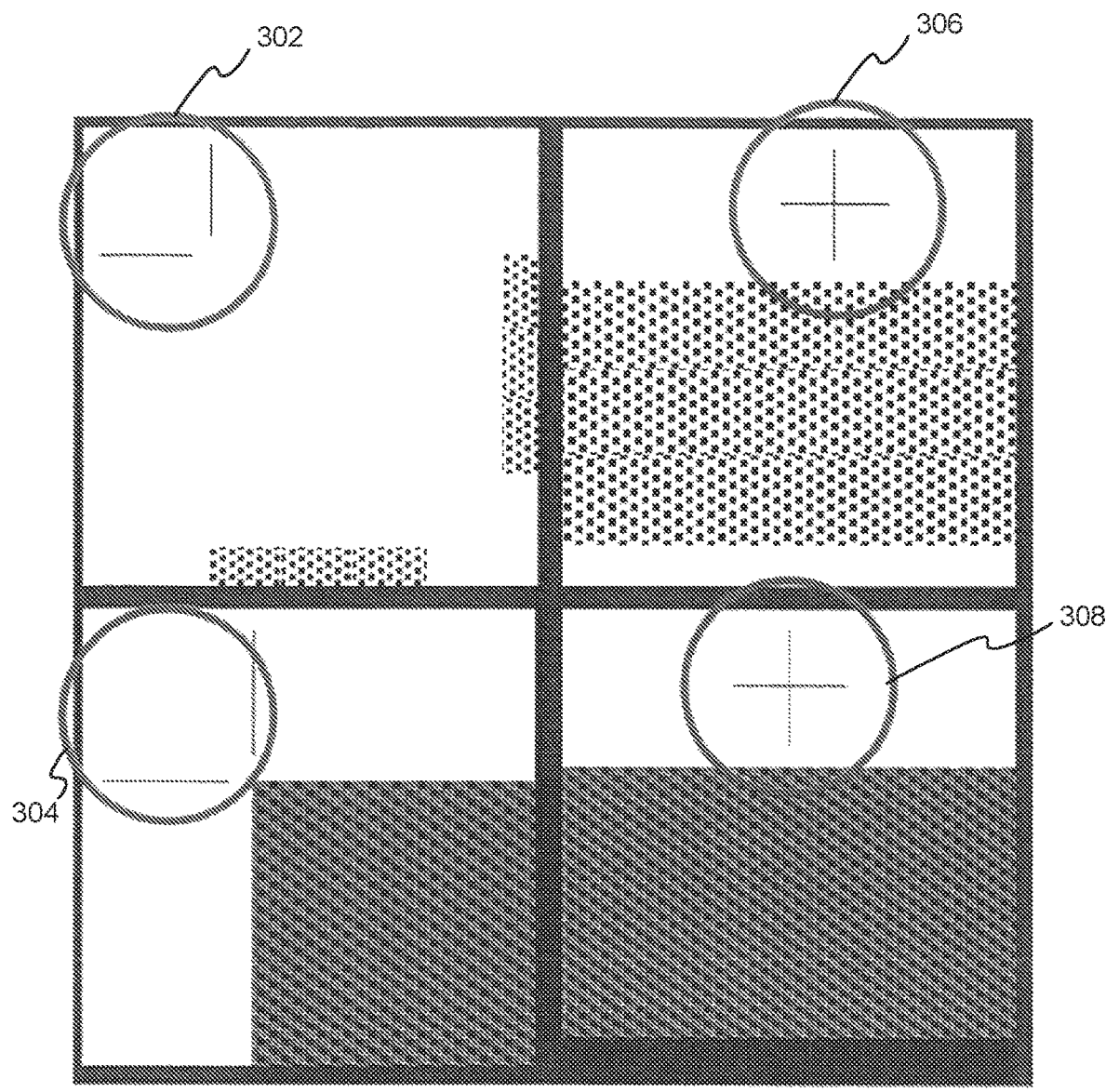
FIG. 3 illustrates exemplary registration marks of a negative and a generic optical matrix, in accordance with one or more implementations.

The system 100 may include an aligner component 110 configured to align one or more registration marks on negative 106 with one or more corresponding registration marks on generic optical matrix 108. FIG. 3 illustrates exemplary registration marks of a negative and a generic optical matrix, in accordance with one or more implementations. The aligner component 110 may be configured to align registrations marks 302 of a negative with registration marks 304 of a generic optical matrix. The aligner component 110 may be configured to align registrations marks 306 of a negative with registration marks 308 of a generic optical matrix. In some implementations, registration mark may include one or more of marks adjacent to a generic optical matrix on the same substrate, marks within a generic optical matrix, marks made by and/or observable via optical means, and/or other marks. Examples of registration marks may include one or more of thin lines, thin achromatic lines, RGB lines, scattering lines, holographic white lines, diffractive and/or holographic thin lines, printed colored lines, and/or other marks. In some implementations, a registration mark may be included in the generic optical matrix and a corresponding registration mark may be included in a corresponding negative.

Turning back to FIG. 1, in some implementations, a radiation curable material may be disposed between negative 106 and generic optical matrix 108. The radiation curable material may have an index of refraction, when cured, that is the same as or similar to an index of refraction of generic optical matrix 108. The radiation curable material may include one or more materials (e.g., liquid, gel, film, and/or other materials) that become cured when exposed to radiation. Examples of such radiation may include one or more of ultraviolet radiation, laser radiation, electron beam radiation, sunlight radiation, UV LED radiation, and/or other radiation. In some implementation, the radiation curable material may include a lacquer that is cured when exposed to ultraviolet light. The radiation curable material may be transparent when cured. The radiation curable material may be colored when cured.

When the radiation curable material has been cured, it may become affixed, adhered, bonded, and/or otherwise attached to generic optical matrix 108. As such, image generation component 104 may be configured to obliterate individual ones of the pixels and/or sub-pixels of generic optical matrix 108 by exposing the physical substrate embodying negative 106 to radiation such that the radiation passes through portions of the physical substrate where negative 106 is not located and exposes corresponding portions of the radiation curable material. The portions of the radiation curable material may become cured responsive to being exposed to the radiation. The cured radiation curable material may obliterate collocated pixels and/or sub-pixels. For example, a given sub-pixel may comprise an optical structure configured to give rise to an optical effect associated with the given sub-pixel. Because the radiation curable material may have an index of refraction that is the same as or similar to that of the optical structure, when the optical structure is buried by cured radiation curable material, the optical structure may lose its ability to provide the optical effect. In some implementations, obliterated pixels and/or sub-pixels may be rendered transparent. The obliterated pixels and/or sub-pixels rendered transparent may allow a substrate of generic optical matrix 108 to be visible at the obliterated pixels and/or sub-pixels rendered transparent. The substrate of the generic optical matrix may be white (or any other color) such that the obliterated pixels and/or sub-pixels rendered transparent appear white (or any other color). In some implementations, a pixel and/or sub-pixel may be obliterated by one or more of chemical etching, laser ablation, and/or other techniques.

In some implementations, image generation component 104 may be configured to print ink and/or otherwise deposit pigment on generic optical matrix 108. The image generation component 104 may be configured to print black ink and/or other pigments over individual pixels and/or sub-pixels (e.g., preserved and/or obliterated pixels and/or sub-pixels). The image generation component 104 may be configured to print black at various densities over individual ones of the remaining pixels and/or sub-pixels to affect a brightness of the individual ones of the remaining pixels and/or sub-pixels. The density of the black may refer to one or more of a stipple density of the black, a grey scale, and/or other ways in which the density of the black may be expressed.

The optical image generated by image generation component 104 may be permanent and/or durable such that it is useful for a variety of applications. For example, due to the fact that a generic optical matrix may be made with multiple left/right views, some implementations may be applicable to three-dimensional displays. Examples of three-dimensional displays may include one or more of 3D computer screens, 3D television, screens for 3D games, telephone screens, head mounted displays, medical monitors, LED displays, ELD displays, LCD displays, OLED displays, SED displays, laser TV displays, carbon nanotubes displays, quantom dot displays, light field displays, game displays, and/or other three-dimensional displays. Some implementations may include an ability to illuminate a generic optical matrix. In some such implementations, a background panel formed by LEDs (or other light source) may be registered with a generic optical matrix. One the side of the generic optical matrix opposite the background panel, there may be color filters also in register with the generic optical matrix. The display may receive transmission signals similar to the transmission signals for TV broadcasting. The transmission signals may depend on individual optical structures of sub-pixels that illuminate a continuous image that will be visible because one image may go to the left eye and the other to the right eye, thus creating continuous three-dimensional images.

Some implementations may facilitate printing instant optical structures. For example, once an optical image has been generated, it may be one or more of electroformed on a nickel plate and/or on a continuous roller, molded on a transparent film, made on top of the covering of a continuous roller, disposed on a nickel sleeve, disposed on a transparent sleeve, disposed on a cast resin roller, and/or otherwise facilitate printing instant optical structures.

Some implementations may facilitate traditional embossing. For example, on an optical image has been created by image generation component 104, it may be converted into a traditional embossing apparatus. Examples of a traditional embossing apparatus may include one or more of a nickel shim, a nickel roller, a plastic shim, a plastic roller, a molded roller, a cast and cure film, a cold-stamping or hot-stamping application, a cast roll-to-roll UV curing equipment with traditional ink printing, and/or other traditional embossing apparatus. The traditional embossing apparatus may be used to engrave based on the optical image using a traditional embossing matching and/or UV/eB molding equipment for various applications, such as one or more of labels, packaging, security documents, posters, optical films, self-cleaning surfaces, structural color applications (e.g., Morpho butterfly colors), biomimetic structures, and/or other applications. Compared to conventional approaches, exemplary implementations may provide a master that can be ready to emboss in only a few minutes instead of waiting days or several weeks. Thus, exemplary implementation may give traditional embossing plants the advantage of being able to fabricate products very quickly for their clients without delays.

Some implementations may be used with traditional printing equipment. For example, on an optical image has been created by image generation component 104, it may be used as an embossing and/or molding accessory of a printing machine for engraving and/or marking the image in register in an ink printout. Contrary to conventional approaches, exemplary implementations may facilitate a printing company not having an optical laboratory at least because it does not need to have electroforming installations, it does not need embossing equipment, and it does not need laser systems.

Figure 4:
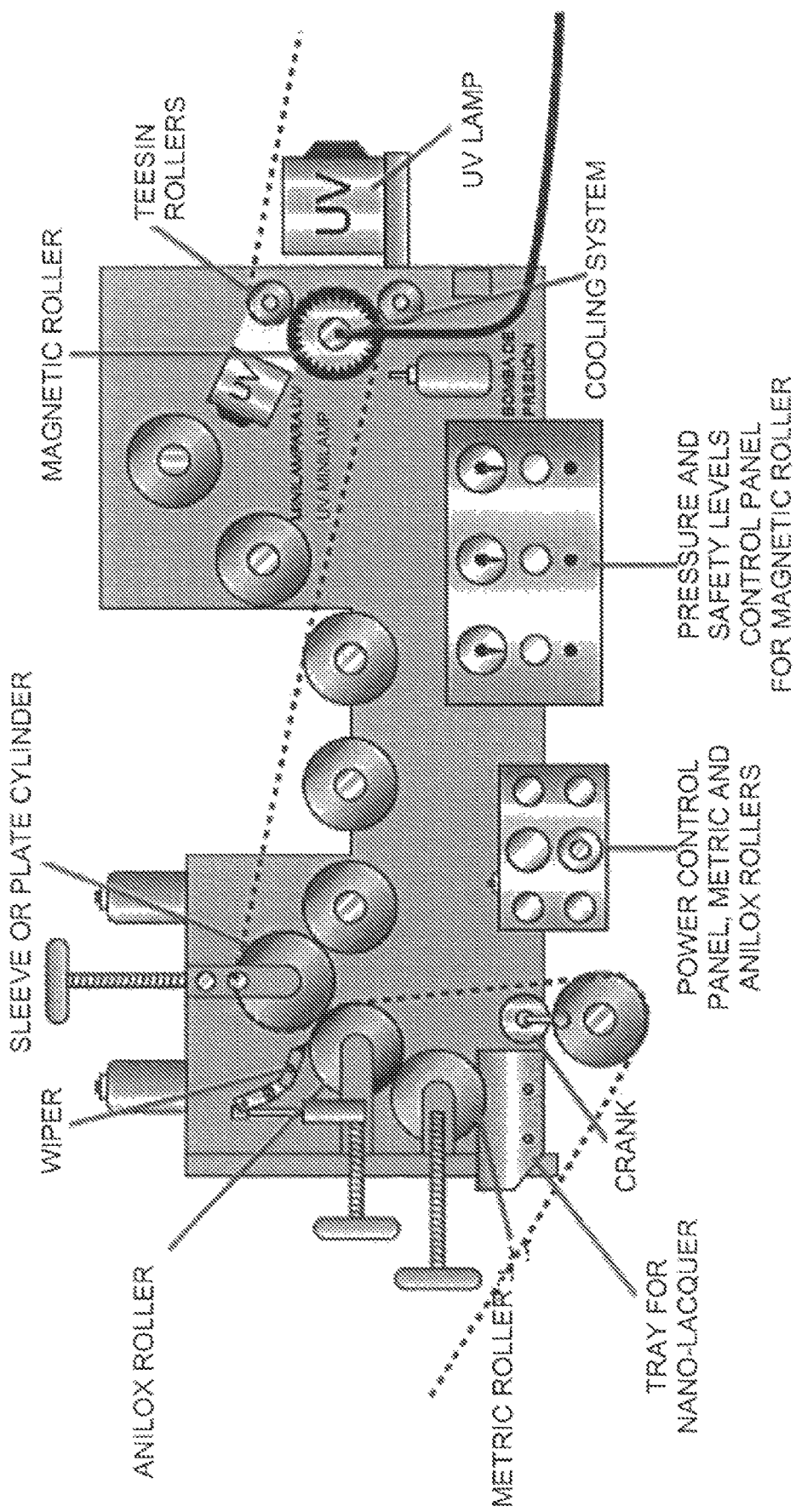
FIG. 4 illustrates an exemplary roll-to-roll printing configuration, in accordance with one or more implementation.

Some implementations may be used with roll-to-roll printing equipment (see, e.g., FIG. 4). For example, in a printing station of a traditional printer, a radiation curable material (e.g., a thixotropic lacquer, a curable UV lacquer or coating, and/or other material) for engraving may be applied before an engraving and/or molding accessory. The engraving and/or molding accessory may have an optical image created by image generation component 104 already fixed. When the radiation curable material reaches an engraving and/or molding station, the optical image may be transferred to it, whether by pressure, UV molding, and/or other techniques. In the case of UV molding, system 100 may take into account that a substrate to be printed on may be a transparent substrate such as a film or an opaque substrate such as a paper. For the purpose of being able to mold both types of substrate, namely those comprising transparent or opaque materials, the latter may be a nickel shim.

Figure 5:
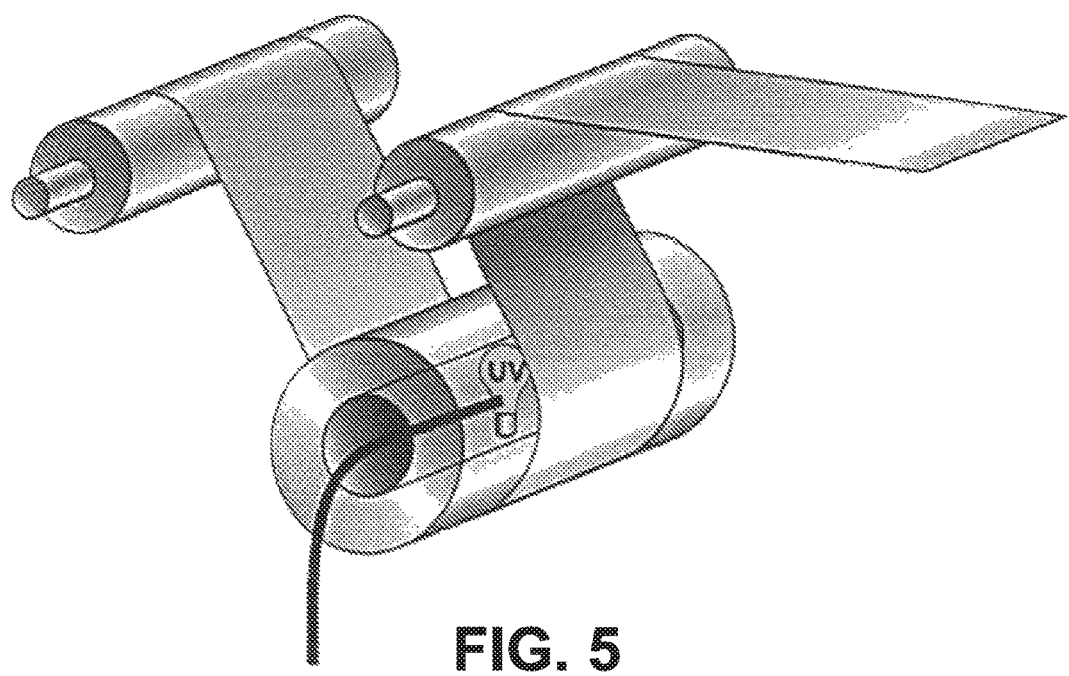
FIG. 5 illustrates an exemplary cylinder with internal lighting, which may be used in a roll-to-roll printing apparatus, in accordance with one or more implementations.

According to some implementation, a cylinder or roller in a roll-to-roll printing apparatus may be illuminated by UV light from its interior for the purpose of molding the optical image on a substrate that travels over its surface (see, e.g., FIG. 5). An effect of the UV illumination may be based on the physical laws of total internal reflection, similar to fiber optics that conducting light in their interior. The UV light may invade the cylinders, either from one or both sides. If the cylinder is transparent, the UV light may be transmitted by the phenomenon of total internal reflection. In some implementations, a cylinder and a holographic shim may be transparent (instead of a nickel shim) with a UV plastic copy of the optical image wrapped around the transparent cylinder.

Figure 6:
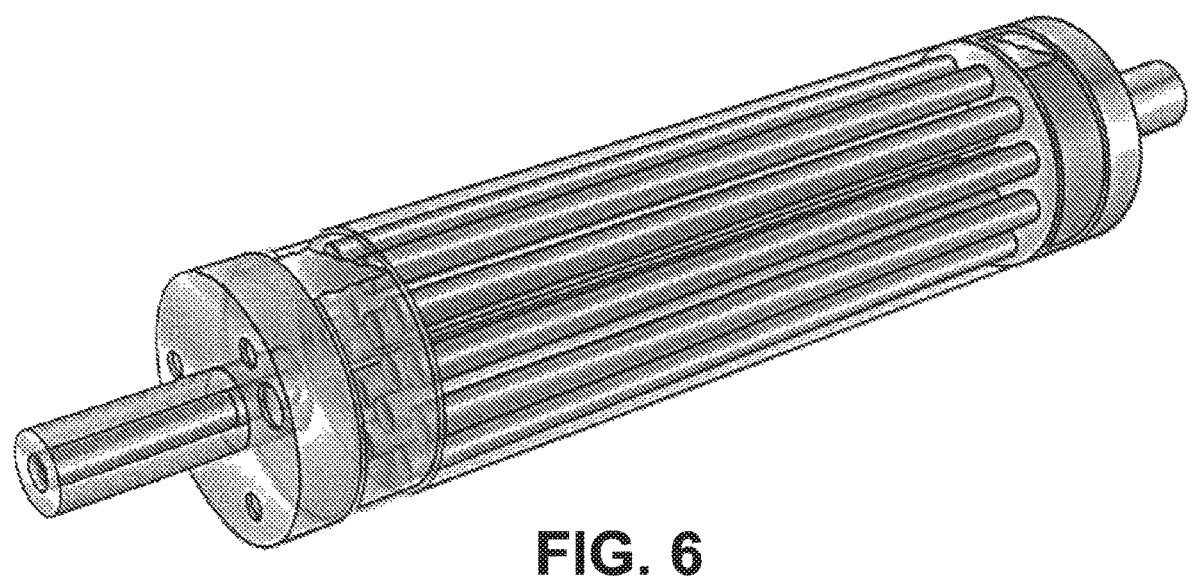
FIG. 6 illustrates an exemplary cylinder with internal cavities to facilitate water cooling of the cylinder, which may be used in a roll-to-roll printing apparatus, in accordance with one or more implementations.
Figure 6A:
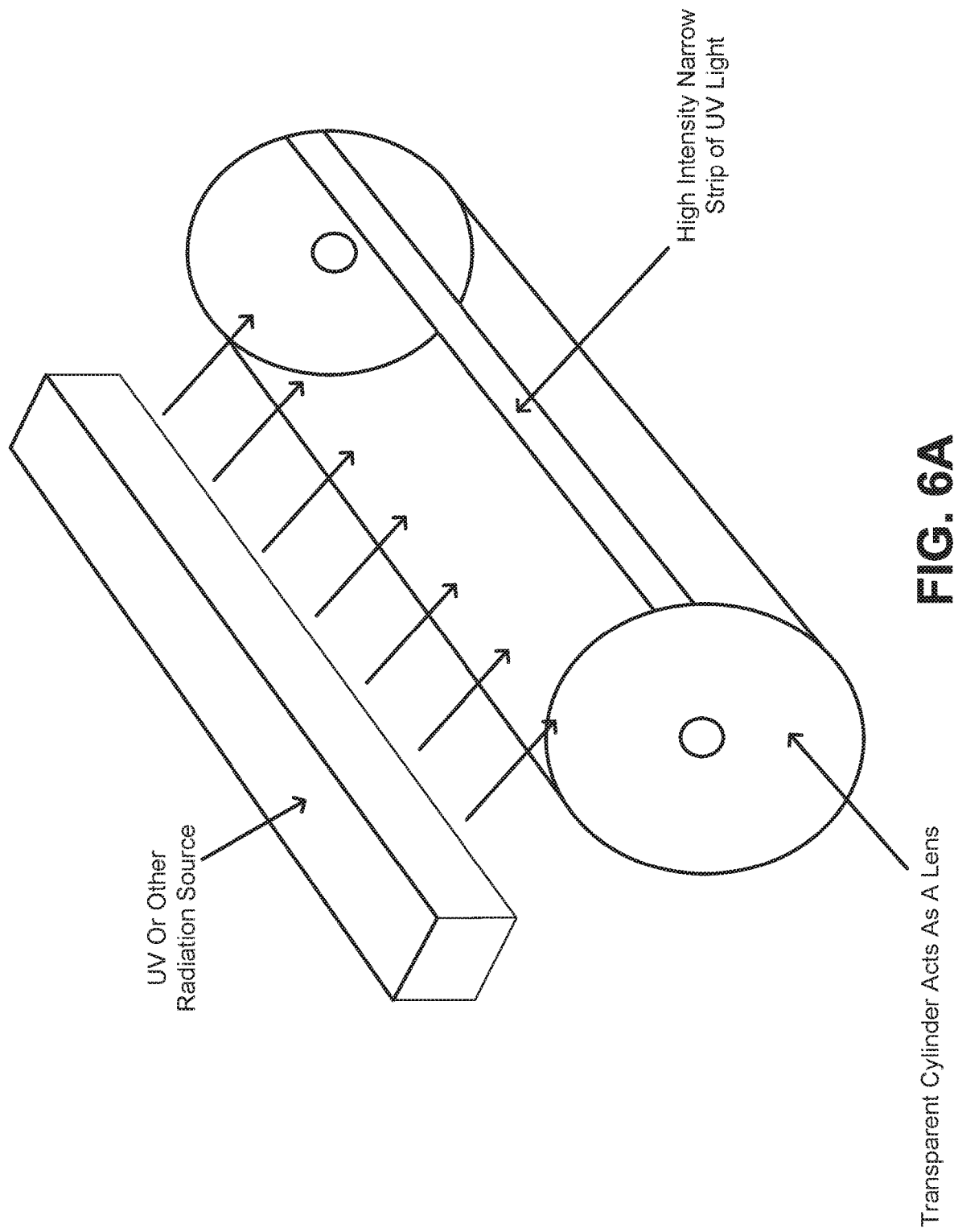
FIG. 6A illustrates an exemplary transparent cylinder that acts as a lens when illuminated in order to project a thin narrow high intensity strip of light on an opposing side of the cylinder, such as for curing purposes, in accordance with one or more implementations.

The cylinder may have internal cavities that enable cooled circulating water to enter through one side and exit through the other side of the cylinder (see, e.g., FIG. 6). Such cooling may help keep the engraving film cold during the engraving and/or molding operation. If the use of a transparent cylinder or roller is not desired, some other type of roller may be used and still enable curing of transparent and/or opaque materials using the total internal reflection of the light. When the substrate encloses the engraving and/or molding, there may be an area between them for curing the lacquer in the area of the outlet, where a narrow and concentrated ultraviolet light beam illuminates the sandwich that has resulted from the pressure between the rollers in the outlet position two or three inches and begins to cure when the lacquer comes into contact with the optical characteristics due to the total internal reflection of the light. The embossing and/or molding roller may be cooled internally by circulating water to keep the temperature of its surface sufficiently cold. In some implementations, a transparent cylinder (e.g., solid or with cavities for cooling water) may be illuminated on one side so the cylinder acts as a lens projecting on the other side of the cylinder a thin narrow high intensity strip of light (e.g., for curing purposes) (see, e.g., FIG. 6A).

Figure 7:
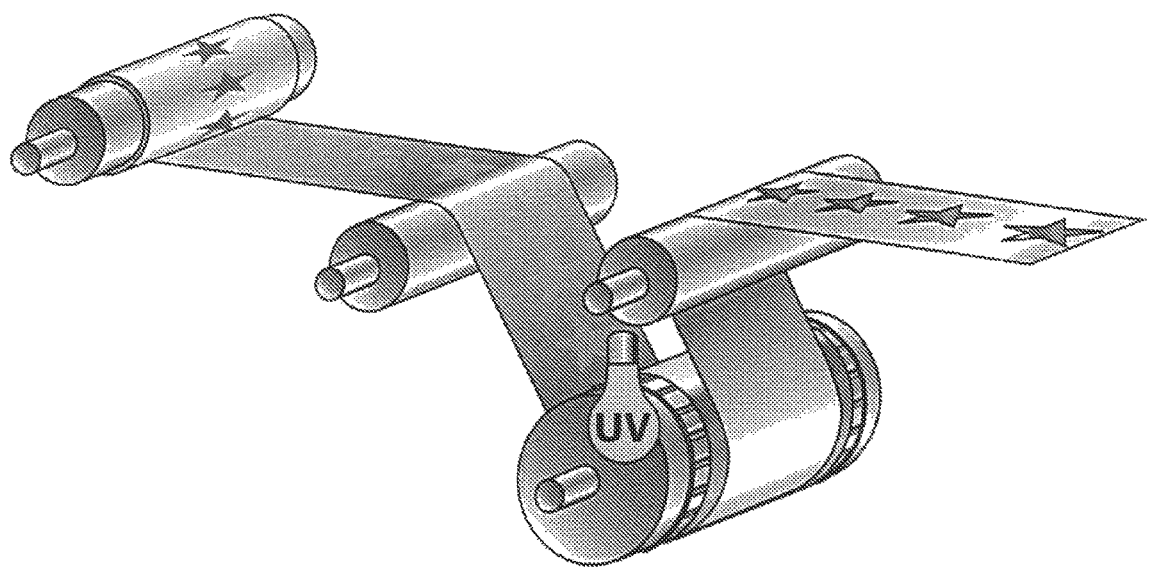
FIG. 7 illustrates an exemplary roll-to-roll printing configuration, in accordance with one or more implementation.

According to some implementations, instead of using an embossing and/or molding station with the optical image created by image generation component 104, a generic optical matrix may be used which is selected depending on the desired optical effect(s). At a station, a printing block with the positive characteristics may be created. The printing block may transfer the image to the substrate via a radiation curable material (e.g., a curable UV lacquer, a thixotropic lacquer, a lacquer for engraving, and/or other material). When this section arrives at the ultraviolet drying station in register, the lacquer may dry in the generic optical matrix in the areas where it is precisely positioned (see, e.g., FIG. 7).

Figure 8:
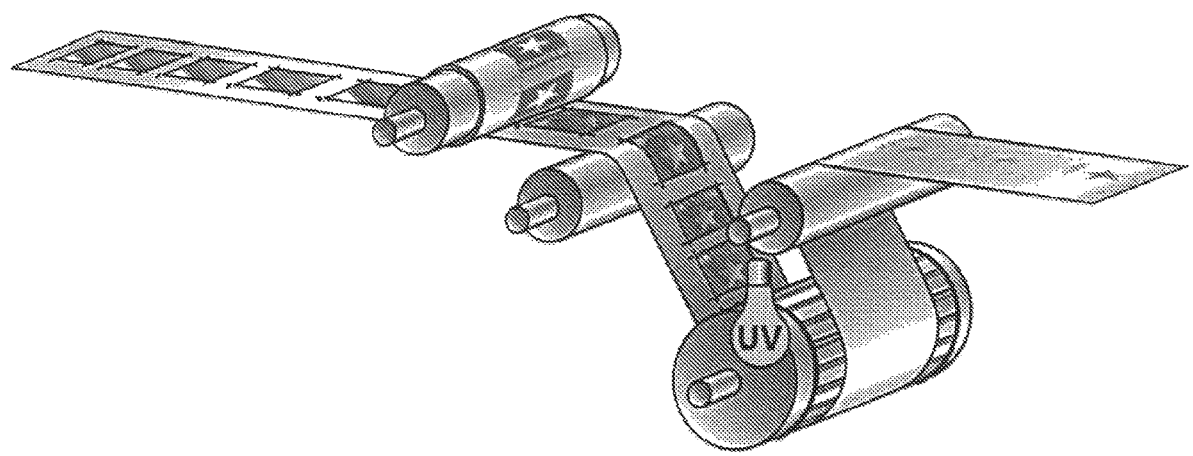
FIG. 8 illustrates an exemplary roll-to-roll printing configuration, in accordance with one or more implementation.
Figure 9:
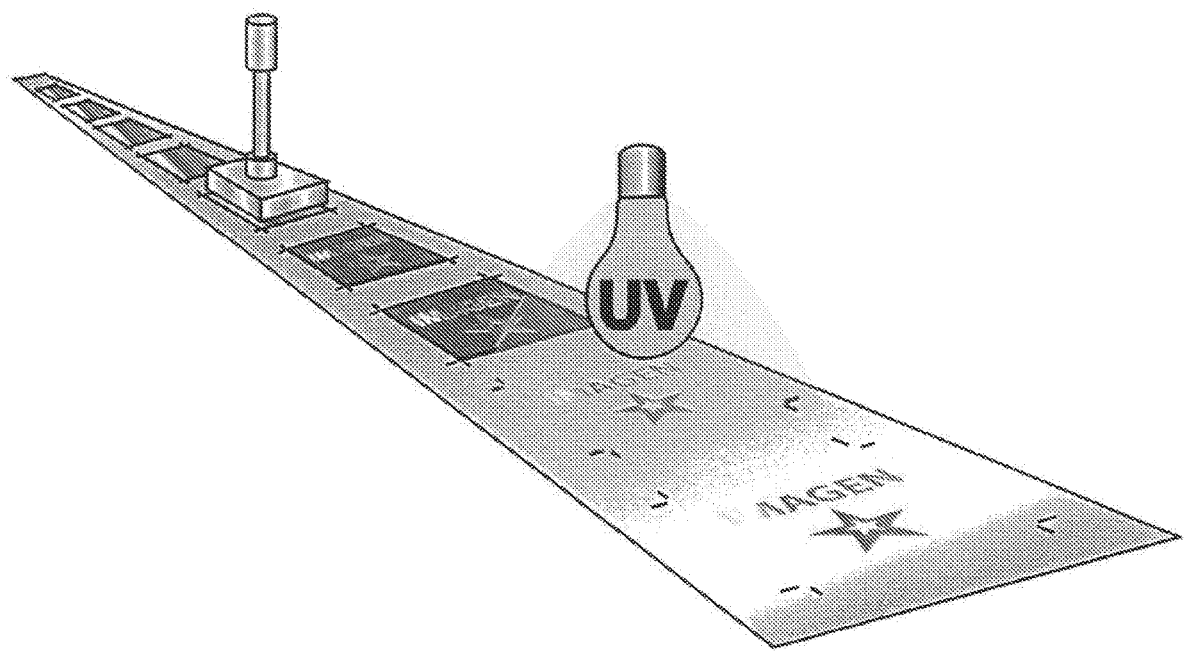
FIG. 9 illustrates an exemplary roll-to-roll printing configuration, in accordance with one or more implementation.

In some implementations, a substrate may be used that was previously engraved and/or molded with ultraviolet light and already has a generic optical matrix on its surface with appropriate registration marks. If the printing machine has re-registration capabilities in one of its printing stations, a printing block may be used that is made from the shape of a negative retained by image negative component 102. This block may transfer the lacquer in register only in the areas that are needed to erase (or obliterate) the optical structures of certain sub-pixels thereby preserving some sub-pixels that create the final optical image. Recall that the negative block may contain some or all of the necessary information of the final optical image (see, e.g., FIG. 8). If the re-registration capability of the machine is not used, the lacquer may be applied randomly or in a specific pattern, creating all sorts of optical effects on the generic optical matrix substrate. In addition, the substrate may include conventional inks in the printout, creating all types of labels (see, e.g., FIG. 9).

The negative 106 being in an electronic format may facilitate a number of techniques for producing optical images. Examples of electronic formats may include one or more of JPEG, TIFF, GIF, BMP, PNG, DDS, TARGA, DWG, PRT, CMX, EPS, SVG, STL, ART, AI, PSD, PMD, QXD, DOC, 3DS, BLEND, DFF, FBX, MA, MAX, SKP, VRML, BAT, JSFL, CLS, JAVA, MPEG, RM, SWF, PAGES, PCX, PDD, SCT, DXF, DWF, SLDASM, WRL, and/or other electronic formats. The image generation component 104 may include an apparatus configured to print one or more of ink, toner, water-based ink, solvent-based ink, UV curable ink, thermal transfer ribbon inks, digital printer inks, ink jet inks, and/or other material directly on the generic optical matrix such that pixels and/or sub-pixels that are printed over become obliterated. The image generation component 104 may include an apparatus configured to facilitate one or more of hot-stamping, cold stamping, laser ablation, chemical etching, and/or other printing techniques. Examples of apparatuses included in image generation component 104 may include one or more of an inkjet printer, a laser printer, flexographic equipment, offset equipment, silk-screen equipment, digital printing equipment, rotogravure equipment, lithographic equipment, coding equipment, demetallizing equipment, silver halide printing equipment, hot-stamping equipment, cold stamping equipment, and/or other apparatuses configured to print material.

The negative in an electronic format may be modifiable such that successively generated optical images are variable in that individual optical images are different from other optical images. For example, the optical image and the successive optical images may include a variable code that is different for different optical images. Examples off the variable codes may include one or more of a linear barcode, a matrix barcode (e.g., a QR code), an alphanumeric code, a graphical code, a 2D code, sequential barcodes, sequential numbers, an encrypted code, a datamatrix code, a matrix 2D code, an Aztec code, a maxi code, and/or other variable codes. The optical image and the successive optical images may include a variable overt security feature and/or a variable covert security feature. An overt security feature may be configured to be used to identify an original document (or other object) by sight and/or touch. A covert security feature may become apparent when a document (or other object) is photocopied or scanned. That is, an additional action is required to activate a covert security feature.

Figure 10:
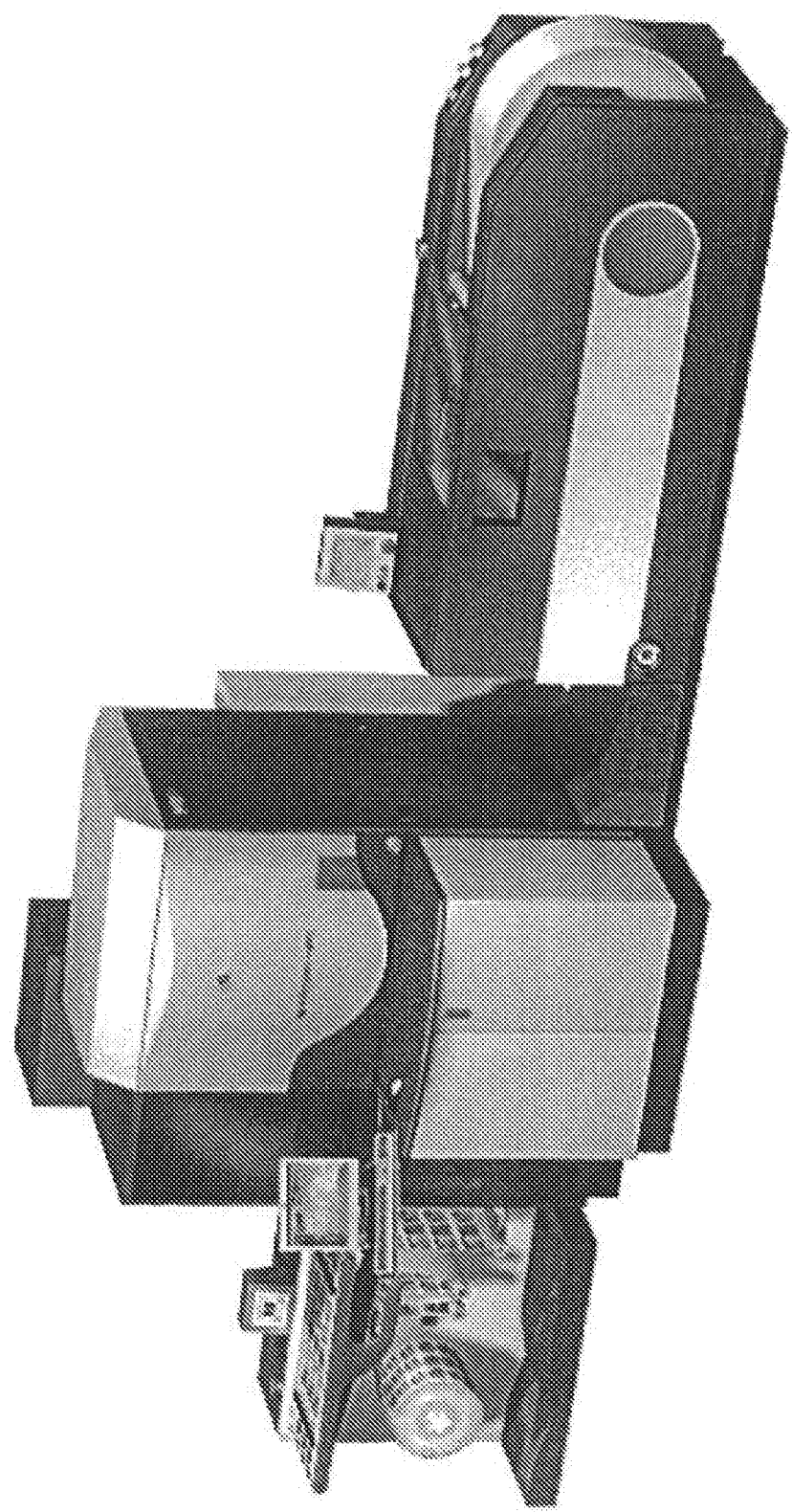
FIG. 10 illustrates an exemplary digital printing configuration, in accordance with one or more implementation.
Figure 11:
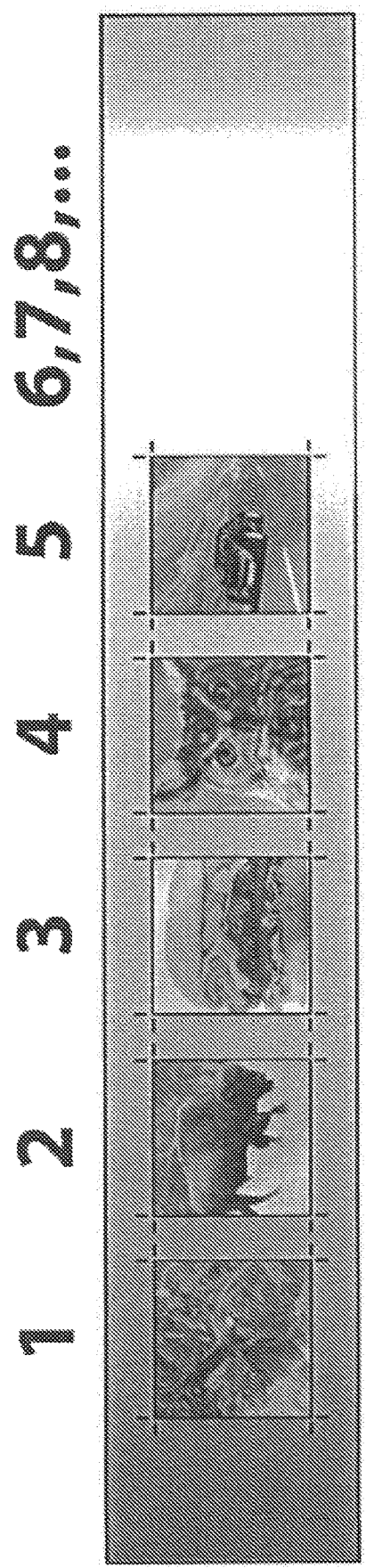
FIG. 11 illustrates a print job of many labels in which an optical image is different on different individual labels, in accordance with one or more implementations.

Some implementations may be used with digital printing equipment (see, e.g., FIG. 10). Examples of digital printing equipment may include equipment configured to facilitate one or more of inkjet printing, digital offset printing, digital thermal transfer printing, laser printing, photographic paper printing, dye sublimation printing, thermal printing, nanography (e.g., as provided by Landa Corporation of Israel), electro ink thermal transfer printing, toner printing, dry-toner electrophotography, and/or other types of printing. As a generic optical matrix passes through a printer or other printing equipment, a negative may be continuously printed in register with the generic optical matrix. When the negative is variable, the optical image may vary from print to print. This may make it possible for the printing equipment to print different digital optical images as the substrate passes through the printing equipment. In contrast to conventional techniques, exemplary implementations may digitally vary the ink printing and/or vary the optical images. By way of non-limiting example, one may print 10,000 labels in which an optical image is different on every label (see, e.g., FIG. 11). This may enable greater security in industrial labeling and packaging, as well as in security documents such as driver's licenses, passports, paper currency, government documents, and/or other security documents. Some implementations may be applicable to track and trace of products based on the optical variability of codes and/or other information encrypted onto the optical images.

If a simple printable substrate is used (i.e., a plain substrate with no pre-printed generic optical matrix), the optical images may be varied print to print. According to some implementations, the digital printer may print different negatives on a substrate as the substrate travels through the machine. The printing of the negative may be performed with inks, metallic inks, transparent inks, lacquers, and/or other techniques. After the printing is done, embossing and/or molding equipment may be used. A transfer mechanism (e.g., film on the roller, nickel, and/or other mechanisms) with a generic optical matrix may press against lacquer already in place, creating variable optical images as substrate goes through the machine. In some implementations, optical structures may be printed in register to conventional inks.

Some implementations may be used with desktop printers. Examples of desktop printers may include one or more of inkjet printers, laser printers, thermal transfer ribbon printers, thermal printers, sublimation printers, photographic printers, silver halide substrate printers, and/or other desktop printers. Optical images generated by image generation component 104 may be included on one or more of security documents, decorative papers, CD covers, over-laminates, security laminates, labels, posters, greeting cards, and/or other printable surfaces. A generic optical matrix may be engraved and/or molded on substrates such as paper (real or synthetic), films (e.g., acetates, polycarbonates, PVC, and/or other films), and/or other substrates with or without adhesive or temperature-activated coatings. A substrate may be cut it into appropriate sheets compatible with desktop printers.

For example, a sheet of paper with a generic optical matrix may be fed into a desktop printer. The desktop printer may receive information (e.g., a negative in an electronic format) from a computer, camera, and/or another device. Based on that information, the negative image may be printed in register with the sheet of paper with ink and/or engraved with a laser. That way, for example, if the idea is to have a 3D optical image in the right-hand corner of the sheet with hidden information, it may be printed at the same time as the rest of the text or drawing that is being printed on the sheet of paper. The final result may be a sheet of paper in full color or in black and white with an optical image in the right-hand corner of the sheet. There may be infinite variations from sheet to sheet. The optical images may be created as an optical watermark that may cover the document completely. If the sheet of paper is an invitation to a party, for example, it may have colorful optical effects in any part desired (e.g., to coincide with an image of balloons).

Using a desktop printer may not require radiation exposure or curing. If a laser printer is used, one or more additional laser heads may be added, which lightly engrave over optical structures of a generic optical matrix on a sheet of paper (or other substrate). Such engraving may be performed to obliterate pixels and/or sub-pixels. If the printer is an inkjet printer, a new color may be added to the printer head. As an example of a color, it may be white and/or any other color. In some implementations, a pressure-sensitive generic optical matrix may be used. By way of non-limiting example, a printer may create many labels on one page which can be optically sequential and/or have decorative and/or optical 3D images.

In some implementations, a transparent substrate may be used for the generic optical matrix. For example, for passports, visas, driver's licenses, and/or other documents, a superposed sheet of material may have any type of optical image produced by image generation component 104. An optical image may include hidden information. An optical image may include sequential optical images. Documents with photographs may be created optically, so the photograph itself may include a 2D optical image, a 3D optical image, an animated optical image, an optical variable code, and/or other optical images of a person. Since that does not currently exist, a system with such capabilities is very advantageous.

Some implementations may be used in optical encoding. Codes may be applied to all types of objects or products. Codes may be variable in that they may include one or more of variable data, sequential numbers, variable codes, variable bar codes, variable images, optically variable matrix barcodes (e.g., QR codes), 2D codes, barcodes, sequential numbers, variable databases, and/or other information. Some implementations may be used for tracking purposes. Codes may be encrypted or unencrypted. In some implementations, objects or products may be encoded with sequentially variable optical images. This may add an extra layer of security due to the fact that these optical images may also have sequentially hidden security characteristics. Even without the characteristic of hidden security, exemplary embodiments used with encoding offer a layer of security to the object or product that is impossible to duplicate on conventional printing equipment.

By way of non-limiting example, a generic optical structure may be engraved on a pressure-sensitive material, which may be used for generic optical matrix labels. Such labels may be delivered to a consumer, who in turn may apply them to their objects or products. Once the object or product passes through an encoding line within an inkjet and/or laser encoding system, the generation of positive images may occur based on digital information provided to the head of the encoder. The encoding head may erase optical structures of the generic optical matrix by placing ink over them and/or using a laser to erase them. The result may be that, as the product travels with its generic optical matrix label, an encoding system available in the marketplace may create optical images in accordance with one or more implementations over them and, at the same time, these images can be sequentially variable.

As mentioned above connection with FIG. 1, image negative component 102 may include electronic storage configured to store the negative in an electronic format (e.g., in implementations in which negative 106 is in an electronic format). Electronic storage may comprise non-transitory storage media that electronically stores information. The electronic storage media of electronic storage may include one or both of system storage that is provided integrally (i.e., substantially non-removable) with a computing device and/or printing apparatus and/or removable storage that is removably connectable to a computing device and/or printing apparatus via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from a computing device and/or printing apparatus, and/or other information that enables image negative component 102 to function as described herein.

The image negative component 102 may include one or more processors configured to provide processing capabilities in image negative component 102. The one or more processors may be configured to provide information associated with the negative to one or more other components of system 100 (e.g., in implementations in which negative 106 is in an electronic format). Examples of such information may include printing instructions to print the negative, instructions to copy or store the negative, instructions to change or modify the negative (e.g., change a value of a code on the negative), and/or other information. The processor(s) may include one or more of a digital processor, an analog processor, a digital circuit designed to process information, an analog circuit designed to process information, a state machine, and/or other mechanisms for electronically processing information. In some implementations, the processor(s) may include a plurality of processing units, which may be physically located within the same device or a plurality of devices operating in coordination. The processor(s) may be configured to execute machine-readable instructions. The processor(s) may be configured to execute machine-readable instructions by software; hardware; firmware; some combination of software, hardware, and/or firmware; and/or other mechanisms for configuring processing capabilities on the processor(s).

In some implementations, a generic optical matrix may be used to provide nanostructures. Examples of such nanostructures may include one or more of photonic structures, hydrophobic structures, gecko-type structures, and/or other nanostructures. By way of non-limiting example, a hydrophobic structure may be combined with a gecko type structure to create an optical variable matrix with these two structures. This may facilitate guiding one or more liquids thorough different passages in order to guide the one or more liquids to different sensors. As another example involving photonic structures, two or more may be combined in an optical variable matrix structure to provide one or more waveguides.

Figure 12:
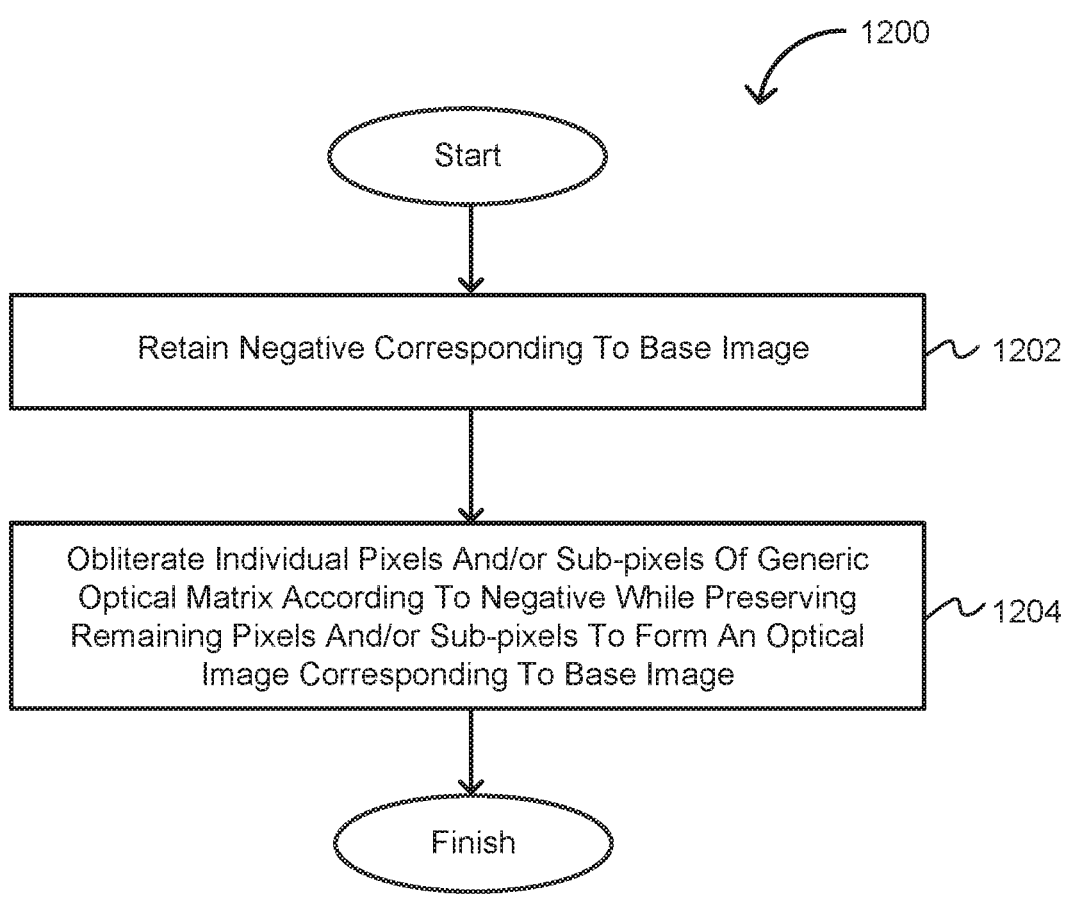
FIG. 12 illustrates a method for fabricating variable digital optical images using generic optical matrices, in accordance with one or more implementations.

FIG. 12 illustrates a method 1200 for fabricating variable digital optical images using generic optical matrices, in accordance with one or more implementations. The operations of method 1200 presented below are intended to be illustrative. In some implementations, method 1200 may be accomplished with one or more additional operations not described, and/or without one or more of the operations discussed. Additionally, the order in which the operations of method 1200 are illustrated in FIG. 12 and described below is not intended to be limiting.

In some implementations, one or more operations of method 1200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

At an operation 1202, a negative corresponding to a base image may be retained. The negative may be based on the base image and a geometry associated with a generic optical matrix. The generic optical matrix may have pixels corresponding to color and sub-pixels corresponding to non-color effects. The pixels may include first pixels corresponding to a first color and second pixels corresponding to a second color. The sub-pixels may include first sub-pixels corresponding to a first non-color effect and second sub-pixels corresponding to a second non-color effect. The geometry may indicate locations and colors of pixels in the generic optical matrix. The geometry may indicate locations and non-color effects of sub-pixels within the pixels. Operation 1202 may be performed by an image negative component that is the same as or similar to image negative component 102, in accordance with one or more implementations.

At an operation 1204, individual ones of the pixels and/or sub-pixels of the generic optical matrix may be obliterated according to the negative while preserving remaining pixels and/or sub-pixels. The remaining pixels and/or sub-pixels may form an optical image corresponding to the base image. The optical image may be colored based on the remaining pixels. The optical image may exhibit non-color effects corresponding to the remaining sub-pixels. Operation 1204 may be performed by an image generation component that is the same as or similar to image generation component 104, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for fabricating variable digital optical images using generic optical matrices, the system comprising:
    an image negative component configured to retain a negative corresponding to a base image, the negative being based on the base image and a geometry associated with a generic optical matrix having a substrate and an array of pixels disposed on the substrate,
    the array of pixels comprising a plurality pixels corresponding to a plurality of colors, the plurality of pixels corresponding to a plurality of colors being arranged such that individual ones of the pixels of a first color are positioned adjacent to individual ones of the pixels of a second color;
    wherein individual ones of the pixels comprise sub-pixels, the subpixels comprising a first sub-pixel corresponding to a first non-color effect and a second sub-pixel corresponding to a second non-color effect; and
    an image generation component configured to obliterate individual pixels and sub-pixels of the generic optical matrix according to the negative while preserving remaining pixels and sub-pixels, the remaining pixels and sub-pixels forming an optical image corresponding to the base image, the optical image being colored based on the remaining pixels, the optical image exhibiting non-color effects corresponding to the remaining sub-pixels.

2. The system of claim 1, wherein the first sub-pixel comprising a first optical structure is configured such that light reflected or transmitted by the first optical structure of the first sub-pixel is directed toward a left eye of a person observing the generic optical matrix from a first viewing angle, and the second sub-pixel comprising a second optical structure is configured such that light reflected or transmitted by the second optical structure of the second sub-pixel is directed toward a right eye of the person observing the generic optical matrix from the first viewing angle, the light reflected or transmitted by the first sub-pixel and the second sub-pixel being the corresponding color of the given pixel.

3. The system of claim 1, wherein the optical image comprises one or more of a hologram, a stereo image, a hologram, a stereo image, an optically variable device based image, a diffractive optically variable image, a zero order device based image, a blazed diffraction structure based image, a first order device based image, a dot matrix image, a pixelgram image, a structural color structure based image, a diffractive identification device based image, an interference security image structure based image, a kinegram image, an excelgram image, a diffractive optical element based image, a photonic structure based image, a nanohole based image, a computer generated hologram, an electron-beam generated optical structure, or an interference patterns.

4. The system of claim 1, wherein the non-color effects of the remaining sub-pixels give rise to one or more optical effects observable when viewing the optical image, the one or more optical effects including one or more of a three-dimensional optical effect, a two-dimensional optical effect, a dynamic optical effect, a scattering effect, a holographic white effect, a lens effect, a Fresnel lens effect, a brightness modulation effect, a lithographic effect, a stereogram effect, a nanotext and/or microtext effect, a hidden image effect, a moire effect, a concealed animated pattern effect, a covert laser readable (CLR) effect, a multiple background effect, a pearlescent effect, a true color image effect, a guilloche effect, an animation effect, an achromatic Fresnel effect, a dynamic CLR image, a kinematic images, a full parallax effect, a scratch holographic effect, a polarizing effect, a watermark effect, a metallic effect, a binary optical structure, or a Fresnel prism.

5. The system of claim 1, wherein individual ones of the remaining sub-pixels reflect light at a specific viewing angle with a color corresponding to that of the individual pixels associated with the remaining sub-pixels.

6. The system of claim 1, wherein the negative is embodied on a physical substrate.

7. The system of claim 6, wherein the physical substrate is a transparent film and the negative is printed on the transparent film.

8. The system of claim 6, further comprising an aligner component configured to align one or more registration marks on the negative with one or more corresponding registration marks on the generic optical matrix.

9. The system of claim 6, wherein a radiation curable material is disposed between the negative and the generic optical matrix, the radiation curable material having an index of refraction, when cured, that is the same as or similar to an index of refraction of the generic optical matrix.

10. The system of claim 9, wherein the radiation curable material is one or more of:
    a lacquer that is cured when exposed to ultraviolet light;
    transparent or translucent when cured; or
    colored when cured.

11. The system of claim 9, wherein the image generation component is configured to obliterate the individual ones of the pixels and/or sub-pixels by exposing the physical substrate embodying the negative to radiation such that the radiation passes through portions of the physical substrate where the negative is not located and exposes corresponding portions of the radiation curable material, the portions of the radiation curable material becoming cured responsive to being exposed to the radiation, the cured radiation curable material obliterating collocated pixels and/or sub-pixels.

12. The system of claim 6, wherein individual obliterated pixels and/or sub-pixels are rendered transparent, the obliterated pixels and/or sub-pixels rendered transparent allowing a substrate of the generic optical matrix to be visible at the obliterated pixels and/or sub-pixels rendered transparent.

13. The system of claim 6, wherein the image generation component is further configured to print black over individual ones of the obliterated pixels and/or sub-pixels.

14. The system of claim 6, wherein the image generation component is further configured to print black at various densities over individual ones of the remaining pixels and/or sub-pixels to affect a brightness of the individual ones of the remaining pixels and/or sub-pixels.

15. The system of claim 6, wherein the optical image is one or both of:
- usable in a printing press to transfer copies of the optical image to different substrates using an embossing process and/or a molding process; or
- usable to make nickel plates and/or engravable sleeves engraving applications and/or molding applications.

16. The system of claim 15, wherein the negative is modifiable such that successively generated optical images are variable in that individual optical images are different from other optical images.

17. The system of claim 1, wherein the negative is in an electronic format.

18. The system of claim 17, wherein the image generation component includes an apparatus configured to print ink or toner directly on the generic optical matrix such that pixels and/or sub-pixels that are printed over become obliterated.

19. The system of claim 18, wherein the optical image and the successive optical images include a variable code that is different for different optical images, the variable codes including one or more of a linear barcode, a matrix barcode, an alphanumeric code, a graphical code, a 2D code, sequential barcodes, sequential numbers, an encrypted code, a datamatrix code, a matrix 2D code, an Aztec code, or a maxi code.

20. The system of claim 18, wherein the optical image and the successive optical images include one or both of a variable overt security feature or a variable covert security feature.

* * * * *